US009826531B2

(12) United States Patent
Bernhard et al.

(10) Patent No.: US 9,826,531 B2
(45) Date of Patent: Nov. 21, 2017

(54) CONCEPT FOR TRANSMITTING AND/OR RECEIVING DATA PACKETS FOR A SYSTEM FOR DETECTING AN EVENT, CORRESPONDING TO AN OBJECT CROSSING OVER A MONITORED LINE (71) Applicant: FRAUNHOFER-GESELLSCHAFT ZUR FÖRDERUNG DER ANGEWANDTEN FORSCHUNG E.V., München (DE)

(72) Inventors: Josef Bernhard, Erlangen (DE); Hristo Petkov, Erlangen (DE); Rafael Psiuk, Erlangen (DE); Gerd Kilian, Erlangen (DE); Hans-Martin Troeger, Erlangen (DE)

(73) Assignee: Fraunhofer-Gesellschaft zur Foerderung der angewandten Forschung, Munich (DE)

( * ) Notice: Subject to any disclaimer, the term of this patent is extended or adjusted under 35 U.S.C. 154(b) by 68 days.

(21) Appl. No.: 14/894,348

(22) PCT Filed: May 28, 2014

(86) PCT No.: PCT/EP2014/061057
§ 371 (c)(1),
(2) Date: Nov. 26, 2015

(87) PCT Pub. No.: WO2014/195206
PCT Pub. Date: Dec. 11, 2014

(65) Prior Publication Data
US 2016/0105890 A1 Apr. 14, 2016

(30) Foreign Application Priority Data

Jun. 7, 2013 (DE) .................. 10 2013 105 936

(51) Int. Cl.
*H04W 72/04* (2009.01)
*A63B 24/00* (2006.01)
(Continued)

(52) U.S. Cl.
CPC ..... *H04W 72/0446* (2013.01); *A63B 24/0021* (2013.01); *A63B 71/0605* (2013.01);
(Continued)

(58) Field of Classification Search
CPC ....... H04W 4/02; H04W 4/028; H04W 72/04; H04W 72/0446; H04L 29/06; H04L 69/22;
(Continued)

(56) References Cited

U.S. PATENT DOCUMENTS 6,993,784 B1 * 1/2006 Shinotsuka ............ H04N 5/775
348/E5.006
7,684,824 B2 * 3/2010 Cha ..................... H04M 1/0245
455/414.1
(Continued)

FOREIGN PATENT DOCUMENTS

DE    102006034063 B4    1/2008
EP    1666916 A2    6/2006
(Continued)

OTHER PUBLICATIONS

German Office Action for Application No. 10 2013 105 936.8.
(Continued)

*Primary Examiner* — Tri H Phan
(74) *Attorney, Agent, or Firm* — 2SPL Patentanwaelte PartG mbB; Mani Arabi (57) ABSTRACT Embodiments relate to a transmitter and/or a receiver for a system for detecting an event which is triggered by an object crossing a monitored line. The transmitter is configured to successively transmit data packets independently of an
(Continued)

occurrence of the event. The receiver is configured to receive successive data packets independently of the occurrence of the event. Each data packet comprises information on a number of events which occurred up to a transmission time of the data packet, wherein the transmission times of successive data packets are each located in a predetermined transmission time period.

18 Claims, 5 Drawing Sheets

(51) Int. Cl.
*A63B 71/06* (2006.01)
*H04L 29/06* (2006.01)
*H04W 4/02* (2009.01)

(52) U.S. Cl.
CPC ............... *H04L 69/22* (2013.01); *H04W 4/02* (2013.01); *H04W 4/028* (2013.01)

(58) Field of Classification Search
CPC ..... A63B 24/00; A63B 24/0021; A63B 43/00; A63B 71/06; A63B 71/0605; G01S 13/82; G08C 17/02; G08C 21/00
See application file for complete search history.

(56) References Cited

U.S. PATENT DOCUMENTS

| 9,184,832 | B2* | 11/2015 | Kilian | ............... H03M 13/6306 |
| 9,300,595 | B2* | 3/2016 | Hupp | |
| 2004/0045038 | A1 | 3/2004 | Duff et al. | |
| 2004/0171388 | A1 | 9/2004 | Couronne et al. | |
| 2005/0023764 | A1 | 2/2005 | Goeben | |
| 2008/0189333 | A1* | 8/2008 | Schmidt | ................ H04L 67/325 |
| 2010/0030350 | A1* | 2/2010 | House | ................ A63B 24/0021 700/91 |
| 2011/0051645 | A1* | 3/2011 | Hong | ...................... H04L 45/48 370/311 |
| 2013/0028103 | A1* | 1/2013 | Hui | ................... H04W 74/0808 370/252 |
| 2013/0128876 | A1* | 5/2013 | Kilian | ............... H03M 13/6306 370/347 |
| 2013/0215909 | A1* | 8/2013 | Hupp | ................ H04W 74/0841 370/498 |

FOREIGN PATENT DOCUMENTS

| EP | 1666916 A2 | 7/2006 |
| WO | 0166201 A1 | 9/2001 |

OTHER PUBLICATIONS

Texas Instruments; Application Note AN014—Frequency Hopping Systems.2012. URL: http://www.ti.com/lit/an/swra077/swra077.pdf.
Sueddeutsche.DE: Torlinientechnik bei Fußball-WM 2014—Wahl zwischen "CoalRef" und Hawk-Eye. Feb. 19, 2013. URL http://www.sueddeutsche.de/sport/torlinientechnik-bei-fussball-wm-wahl-zwischen-goalref-und-hawk-eye-1.1604313 [recherchiert am Feb. 10, 2014].
PCT/EP2014/061057, Written Opinion by Foreign Search Authority for PCT/EP/2014/06105.

\* cited by examiner

Fig. 8

CONCEPT FOR TRANSMITTING AND/OR RECEIVING DATA PACKETS FOR A SYSTEM FOR DETECTING AN EVENT, CORRESPONDING TO AN OBJECT CROSSING OVER A MONITORED LINE

CROSS-REFERENCE TO RELATED APPLICATIONS

This application is the National Phase under 35 U.S.C §371 of PCT International Application No. PCT/EP/2014/061057, which has an International filing date of May 28, 2014, and which claims priority to German Patent Application No. 10 2013 105 936.8, filed on Jun. 7, 2013, the entire contents of which are hereby incorporated herein by reference.

FIELD

Embodiments relate to a concept for transmitting and receiving data packets for a system for detecting an event corresponding to an object crossing a monitored line. In particular, embodiments relate to corresponding transmitters, receivers, transmitting methods, receiving methods and computer programs capable of same.

BACKGROUND

With numerous applications it seems to be desirable to reliably detect an event corresponding to a movable object crossing a monitored line, like e.g. whether a gaming device, in particular a ball, has crossed a goal or touch line, for example. For this purpose in the field of sports, in particular in team sports like football, handball, American football, rugby or ice hockey, automatic goal detection systems may be used which serve to support the referee to decide for or against a goal being the event to be detected. The decision whether a goal has been scored is frequently taken by means of an evaluation electronic at the or in the proximity of the goal itself with these systems.

Apart from goal detection systems which are based on an evaluation of artificially generated electromagnetic fields at the gaming device and/or goal, also optical and/or video-based detection systems exist and/or goal detection systems like the so-called Hawk-Eye System, for example. With these systems goal detection may also be executed automatically. With any systems, decisions regarding an event, like e.g. "goal", may be processed and/or evaluated in computers outside the playing field.

It would be desirable regarding these detection systems and/or systems for detecting, where goal detection and/or detection of the event is frequently executed outside the gaming field, to transmit information, whether and event and/or goal has been detected and/or not, to a referee on the court or field who may be moving around the field, for example.

SUMMARY

It may thus be an object of embodiments to provide a transmission possibility which guarantees that a piece of information on the detection of an event may be transmitted securely, reliably and/or promptly to a receiver.

This object may be solved by a transmitter, a receiver, a method for transmitting, a method for receiving and computer programs, each comprising the features of the independent claims.

Further advantageous embodiments and implementations are subject matter of the independent patent claims.

A first aspect relates to a transmitter for a system for detecting an event corresponding to an object crossing a monitored line and/or being triggered thereby. The transmitter here is configured (for example by means of corresponding electric transmitter circuits) to transmit data packets successively independent of an occurrence of the event. The transmitter is configured and/or adapted to provide each of the data packets with a piece of information on a number of events which occurred up to a transmission time of the data packet. Apart from that, the transmitter is configured to transmit data packets so that the transmission times of successive data packets are each within a predetermined transmission time period.

A further aspect relates to a corresponding receiver for a system for detecting an event corresponding to an object crossing a monitored line and/or being triggered thereby. The receiver is configured (for example by means of corresponding electric receiver circuits) to receive successive data packets independent of the occurrence of the event. Each of the data packets comprises a piece of information on a number of events which occurred up to a transmission time of the data packet, wherein the receiver may read out and further process the information. The transmit and receive times of the successive data packets are each within a predetermined transmit and/or receive time period.

A further aspect relates to a method for transmitting data packets for a system for detecting an event corresponding to an object crossing a monitored line and/or being triggered thereby. Here, in one method act successive data packets are generated such that each of the data packets comprises a piece of information on a number of events which occurred up to a transmission time of the data packet. Further, in a further method act, successive data packets are transmitted independent of an occurrence of the event such that the transmission times of successive data packets are each in a predetermined transmission time period.

A further aspect relates to a method for receiving data packets for a system for detecting an event corresponding to an object crossing a monitored line and/or being triggered thereby. In the method, in one method act successive data packets are received independent of an occurrence of the event. The transmit and/or receive times of the data packets are each in a predetermined transmit and/or receive time period. In a further method act the data packets are read out, wherein each of the data packets comprises a piece of information on a number of events which occurred up to a transmission time of the data packet. For example, in the method the data packets may also be evaluated and indicated when the number of events is higher as compared to the number of events of a preceding data packet.

Further aspects each relate to a computer program for executing one of the above-mentioned methods or at least of individual method acts thereof, when the computer program is executed on a programmable hardware component, like e.g. a digital signal processor (DSP) or an application-specific integrated circuit (ASIC).

According to embodiments, successive data packets may, for example, be data packets which are transmitted sequentially, cyclically and/or periodically. Here, time periods between transmitting and/or transmission times of the data packets may have a different duration and/or length. For example, a time interval between the transmission time of a preceding data packet and the transmission time of a current data packet may be shorter than the interval between the transmission time of the current data packet and the transmission time of a subsequent data packet and/or a next data packet. In other words, a transmission time of a data packet may be freely selectable within its predetermined transmission time period. The transmission time of a data packet may thus be rather at the beginning or in the middle of the predetermined transmission time period for the data packet.

A transmitter configured to transmit data packets independent of an occurrence of an event may successively transmit data packets each at a transmission time within a predetermined transmission time period, independent of the occurrence of the event. If the event occurs before the transmission time of a data packet, the current data packet may possibly also comprise new, different information on an increased and/or incremented number of events which occurred as compared to the preceding data packet. If, however, no event occurred before the transmission of a data packet, the data packet may still be transmitted within the predetermined transmission time period and may comprise a piece of information on the same number of occurred events as the preceding data packet.

According to embodiments, the occurrence of the event has not been predetermined and/or may not easily be anticipated, but may, for example, be transmitted to the transmitter by the system for detecting the event which is coupled and/or coupleable to the transmitter. In comparison, the transmission time period for a data packet is predetermined and/or at least given within certain limits. Here, the predetermined transmission time period may, for example, either be given by the transmitter or by the system for detecting the event such that the predetermined transmission time period may already beforehand be known to the transmitter and/or receiver or be determined by same.

Due to the fact that according to the above mentioned aspects data packets may be transmitted and/or received successively independent of an occurrence of an event such that each of the data packets comprises a piece of information on a number of events which occurred up to a transmission time of the data packet, a very secure transmission of the detected event may be enabled. This is possible as the transmission method may be implemented relatively tap-proof. The danger for an event detected by the (event detection) system to be tapped from the outside is reduced as not only at the time of a positive event detection, e.g. a goal detection, the information may be transmitted to the receiver unidirectionally by the system, e.g. by means of a radio transmitter. Instead, information and/or data packets may, for example, be transmitted continuously and/or successively. From the transmission of one single data packet alone the detection of an event may thus possibly not be concluded. That way, the danger may, for example, be minimized and/or eliminated, that the result of the detection system may be tapped from the outside. In other words, for example, the reliability of transmission and thus security may be increased. By the fact that the transmission of the data packets takes place independent of the event, covering up information in the transmission and/or possibly prevention of interception/tapping may be increased. That way it may, for example, be prevented that erroneous goal information is transferred to/from the referee, for example. Further, using the transmission according to the above mentioned aspects, information on the detection of the event may be acquired virtually in real time involving only minimal delay, for example.

Further, the data packets may, for example, comprise a length and/or time duration which is independent of an occurred event and/or the occurrence of an event. That way it may be enabled, for example, that using the length of the data packets no conclusion regarding goal detection and/or event detection may be made. For example, the data packets may always comprise the same length and/or time duration and a different content depending on a detected event, for example. Alternatively, the data packets may, for example, always comprise a different, e.g. randomly selected length which is also independent of a detected event.

Additionally, the data packets and/or the information of the data packets and/or the data content and/or the data may be encoded and/or scrambled. In this respect, any encoding method (e.g. AES128, AES256, etc) may be used—depending on the aspired security level. By this it may possibly be enabled that the data content of the data packets is illegible for unauthorized persons which is how an unwanted manipulation of the event detection may be prevented.

In some further embodiments the transmitter may be configured and/or adapted to transmit the data packets such that each of the data packets comprises a piece of information on a transmission time of the data packet. Analogue to that, in some further embodiments the receiver maybe configured and/or adapted to read out and/or further process the data packets which comprise a piece of information on a transmission time of the data packet. This way, possibly manipulation protection may be improved by encoding and interval timing of a receive window for the receiver which may result from the transmission of the information of the transmission times.

The transmission time and/or information on a transmission time may, for example, be a time measured from a defined zero point and/or zero time (reference variable) in small units, for example seconds or milliseconds. The transmitter, the receiver and the system may, for example, comprise a common zero point. In other words, transmitter and receiver may be synchronized. The information on a number of occurred events may, for example, be a counter reading, in particular a goal counter and/or a score. In other words, if such an event (e.g. a goal in a soccer game) is detected using the system for detecting the event, a number of occurred events may be increased, e.g. the goal counter may be incremented for a goal. For example, the corresponding information may be updated in a telegram of the data packet.

In some embodiments, the data packets may advantageously be transmitted wirelessly, i.e. via a radio interface. This way it may be enabled for the transmitter to be implemented in a mobile way. It may thus, for example, be facilitated for a person, for example a referee or linesman who is moving around the field, to have the receiver on themselves.

In some further embodiments, the transmitter is configured to generate each of the data packets such that each of the data packets comprises a piece of information on a radio resource for a data packet succeeding the data packet. A succeeding data packet may here, for example, be the directly (at the next transmission time in the next predetermined transmission time period) following data packet. Accordingly, a preceding data packet may, for example, comprise information on a radio resource for the current data packet. The current data packet may, for example, comprise information on a radio resource for the next or the following data packet. Here, according to embodiments, the succeeding or following data packet is the data packet which is transmitted next after the current data packet. This way it may possibly be enabled for the receiver to receive information on the following and/or next data packet in advance and to adjust itself and/or its receiver circuit accordingly. According to embodiments, a radio resource may be any radio resource, for example a time interval, a frequency, a code etc. or a combination thereof. Further, the data packet may comprise information on radio resources relating to several succeeding data packets, for example, for a next, next-again and/or next-next-again etc. data packet. This way, for example, the security of the transmission may be increased. If, for example, a data packet may not be received and/or read out by the receiver, the receiver may have received the information on the next data packet via the radio resource possibly already from one of the preceding data packets.

In some embodiments, the transmitter may be configured to generate the data packet such that the data packet comprises a piece of information on an age of the occurred event. For example, the data packet may comprise a piece of information on the age and/or an up-to-dateness of the event which occurred last (e.g. "goal"). For example, regarding information on the age, the data packet may comprise a time when the number of events which occurred up to the transmission time was increased last. This way it may, for example, be facilitated to recognize from the data packet how up-to-date and/or reliable the a piece of information on the number of events is. This may, for example, be important when data packets do not arrive at the receiver or are received by the same in the correct order or when a plurality of transmitters transmit data packets. In other words, the age and/or the a piece of information on or relating to the age of the occurred event, may, for example, be an age of a goal counter reading, a time stamp or a time value, or a count value which indicates how many data packets the event and/or an increase of the number of events lies back. Based on the age information a receiver may, for example, decide independently whether the information is still up to date and is, for example, to be displayed on a display device coupled to the receiver.

In some further embodiments the transmitter is configured to transmit each of the data packets at a random transmission time (within the predetermined transmission time period and/or transmission interval). The transmission times may be determined by the transmitter by means of a random number generator, for example. According to embodiments, the data packets are transmitted at the random transmission time such that the data packet is transmitted completely within its predetermined transmission time period. It may thus be facilitated, for example, that a predetermined transmission speed and/or rate and thus also a prompt transmission of a detected event is guaranteed. In other words, between two transmission packets a maximum delay is to be maintained. It may this way possibly be enabled that a certain equal distribution, for example a requested transmitter duty cycle, which may for example correspond to a proportion of the transmission times as compared to the overall time of transmission, may be maintained.

In some further embodiments, the transmitted radio resource is the transmission time of the successive data packet. Here, the successive data packet is the data packet transmitted next after the current data packet. It may thus, for example, be facilitated that the receiver receives a piece of information on when and/or in what interval or receive time window the next and/or following data packet is to be expected. It may thus be facilitated, if applicable, that the receiver reduces a receive power of a receiver circuit and/or goes into an idle or sleep mode and/or is put to sleep between the receive time windows to be expected. This way the receiver may save current, for example. In other words, receiver may be implemented in a power-saving way by the fact that no continuous data stream is transmitted but short data packets in cyclically recurring intervals.

In some embodiments the transmitter may be configured to transmit the successive data packets by multiplexing with a second transmitter. It may thus be enabled, if applicable, that two different events, that is, for example, a goal of a first team and a goal of a second team, are detected, monitored and/or transmitted to a receiver. In this respect at least one of the two transmitters may, for example, comprise a receive module which is configured to receive successive data packets of the other transmitter. For example, the second transmitter may basically be implemented analogue to the first transmitter. Apart from that, the data packets of the second transmitter may basically be set up analogue to the data packets of the first transmitter. For example, each of the data packets of the second transmitter may comprise at least one piece of information on a number of events which occurred up to the transmission time, i.e. for example goals of a second team. Further, the (first) transmitter may be configured to generate the successive data packets such that each data packet comprises a piece of information on the number of second events which occurred up to the transmission time. Here, multiplexing methods of any kind may be used: for example, space-, frequency- and/or wavelength-, time- and/or code-division multiplexing. In other words this means, that with systems in which different events are detected, for example goals of two teams, for each event a separate detection system may be utilized. The detection of the event, for example the goal event, may for example be transmitted directly by a transmitter which may, for example, be integrated at the respective detection location and/or detection system and/or be connected to the system. Data packets which comprise a piece of information on a number of first occurred events and a piece of information on a number of second occurred events may thus be generated by at least one transmitter. It may thus possibly be enabled for the security of transmission to be increased. In a system comprising two transmitters the transmitter may, although a data packet of the second transmitter is not received by the receiver, for example, receive the a piece of information on the number of second events with a data packet of the other and/or first transmitter. This way, if applicable, an additional and/or redundant transmission path for the detection of an event may be facilitated. The second transmitter may basically be set up and/or configured analog to the first transmitter to generate and/or transmit data packets which comprise a piece of information on a number of occurred first events.

Accordingly, a further aspect relates to a system for transmitting an event corresponding to a an object crossing a monitored line, the system comprising a first transmitter and a second transmitter, the transmitters being configured to transmit data packets (as described) by multiplexing, and each of the transmitters being configured to receive data packets of the respective other transmitter.

According to some embodiments the event is a goal which, for example, corresponds to a gaming device, in particular a ball or a puck, crossing a monitored goal line. By this, the transmitter and/or also the receiver may utilize the methods and the computer programs for goal detection systems of any kind. For example, such goal detection systems may be utilized in team sports, e.g. football, handball, rugby, American football, Australian football, water polo etc. Of course also other events are possible, like e.g. an athlete crossing a line.

In some further embodiments the receiver may additionally be configured to output a signal which indicates the event if a currently received data packet comprises a piece of information on a number of occurred events which is increased as compared to a number of occurred events according to a preceding data packet. This way it may be facilitated, for example, that a referee only receives updated information when an event, for example a goal has actually been scored and/or detected. In other words this means that when an event is detected by the system, the number of occurred events in the currently successive data packet is increased. Regarding the change of the number of events, for example a changed value of a goal counter, the receiver may see that an event has been detected and/or a goal has been identified by the system. This way, an event, for example a goal event, may be indicated acoustically, visually and/or as a vibration alarm to a user, for example the referee. This may be executed by the receiver both for a first event (e.g. goal of a first team) and also for a second event (e.g. goal of a second team). Here, for example, for a first event a different signal than for a second event may be output.

Additionally or alternatively, the receiver may be implemented to reduce a receive power of a receiver circuit between two successive data packets. For example, the receive power of the receiver circuit may be reduced based on the information on the transmission time of the successive data packet in the current data packet. In other words, the receiver may reduce the receive power between intervals or receive time windows in which it expects the reception of data packets. This way it may possibly be facilitated that the receiver goes into an idle and/or sleep mode in between two successive data packets. This way possibly energy and/or an energy consumption of the receiver may be saved and/or reduced. It may, for example, be facilitated for the receiver to be implemented as an easily portable, battery-operated mobile device. This way it may be acquired for the receiver to be equipped and/or supplied by a comparatively small energy supply means, for example a battery or an accumulator or a so-called Energy-Harvester. The energy supply means may comprise a comparatively long runtime which lasts for example at least for the duration of a game in a team sport.

By the fact, for example, that the receiver goes into an idle mode when no data packets are to be expected, the probability may be reduced that at these times and/or in these time periods an unwanted data packet and/or an interference signal is received from a third party or further transmitter which is not part of the system or from an interference system.

According to some embodiments the receiver may be configured, if it does not or not completely receive a data packet in an interval at the transmission time and/or an expected receive time window according to a piece of information in a preceding data packet, to increase and/or maintain its receive power until it receives a next data packet. This way, for example, a transmission may be improved and/or transmission security may be improved. In other words: should the receiver not be able to receive the data packet at all or only incompletely, it may not be able to receive the information on the transmission time of the next data packet. In this case the receiver may remain active until it receives a next data packet. The receiver may consequently enter a so-called acquisition mode. This way it may possibly be prevented for the receiver, if it does not or only incompletely receive a data packet, to remain in a state of reduced receive power of the receiver circuit and miss all following data packets.

Additionally or alternatively, the receiver may be configured to reduce a receive power of a receiver circuit when the receiver receives no data packet over a period of time which is longer than the predetermined transmit and/or receive time period. It may thus possibly be facilitated for the receiver to enter a so-called "cabin mode", for example, when it is outside a reception range of the transmitter, for example in a cabin within a stadium. This way it may be prevented, for example, for the receiver to remain continuously active outside the reception range and to consume too much current to wait for a data packet comprising information on the transmission and/or reception time for the successive data packet. This way it may be facilitated for the receiver, when it is located outside the reception range of the transmitter, to save energy, in particular battery or accumulator power. The time period in which noting (usable) is received may, for example, be larger by a certain factor than the transmission time period. The factor and/or the interval of the time period which may trigger the so-called cabin mode may be known to the receiver. It may thus possibly be facilitated that the receiver may differentiate between a cabin mode and accidentally missing and/or not receiving a data packet.

Additionally or alternatively, the receiver may be configured to increase the receive power of the receiver circuit for a time window which is longer than the predetermined transmission time period and/or the predetermined transmission time window. This way it may be facilitated, for example, when the receiver in a so-called cabin mode, i.e. has reduced the receive power of the receiver circuit, that the receiver again and again enters an active mode in order to check whether it can receive data packets. This way the receiver may check whether it already is in a reception range of the transmitter again, for example has left the cabin.

In some embodiments the receiver may be worn on a wristband. For example, the receiver may be integrated into a watch. This way it may possibly be facilitated that the receiver may for example be provided to a referee for indicating the goal detection result and/or for indicating the detection of an event as a small mobile device, preferably as a watch which is battery-operated. As already described above, the receiver and thus also the watch may comprise an energy-efficient radio interface. Due to the fact that the receiver may be integrated into a watch, possibly a mobile device which is easy to carry and operate may be provided to a user, in particular to a referee, for example, wherein the device is able to display both a time and also a score and also a detection of an event, the result of a goal detection, for example.

The embodiments and their features disclosed in the above specification, the attached claims and the enclosed Figures may both individually and in any combination be of importance and be implemented for realizing an embodiment in its different implementations.

BRIEF DESCRIPTION OF THE DRAWINGS

In the following, some merely exemplary embodiments are explained in more detail with reference to the accompanying drawings, in which.

DETAILED DESCRIPTION

Various embodiments will now be described more fully with reference to the accompanying drawings in which some embodiments are illustrated. In the figures, the thicknesses of lines, layers and/or regions may be exaggerated for clarity.

In the following description of the accompanying figures, which merely show some exemplary embodiments, like reference numbers may refer to like or comparable components. Furthermore, summarizing reference numbers may be used for components and objects which occur several times in an embodiment or in a drawing, but are described jointly with regard to one or several features. Components or objects which are described using like or summarizing reference numbers may be realized in the same way—however, if necessary, also be implemented differently—with regard to individual, several or all features, such as their dimensioning, as far as the description does not explicitly or implicitly require otherwise.

Even though embodiments may be modified and amended in various ways, embodiments in the figures are represented as examples and are described in detail herein. However, it is made clear that it is not intended to limit embodiments to the particular forms disclosed, but on the contrary, embodiments should cover any and all functional and/or structural modifications, equivalents, and alternatives falling within the scope of the invention. Like reference numbers refer to like or similar elements throughout the entire description of the figures.

It should be noted that, when an element is referred to as being "connected" or "coupled" to another element, it can be directly connected or coupled to the other element or intervening elements may be present. In contrast, when an element is referred to as being "directly connected" or "directly coupled" to another element, no intervening elements are present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to limit the embodiments. As used herein, the singular forms "a," "an" and "the" are intended to include the plural forms as well, unless the context clearly indicates otherwise. It is further made clear that the terms, e.g., "comprises," "comprising," "includes" and/or "including," as used herein, specify the presence of stated features, integers, steps, operations, elements and/or components, but do not preclude the presence or addition of one or more further features, integers, steps, operations, elements, components and/or groups thereof.

Unless defined otherwise, any and all terms (including technical and scientific terms) used herein have the same meaning as commonly understood by one of ordinary skill in the art to which embodiments belong. It is further made clear that terms, e.g., those defined in commonly used dictionaries, should be interpreted as having a meaning that is consistent with their meaning in the context of the relevant art and should not be interpreted in an idealized or overly formal sense unless expressly defined herein.

Figure 1:
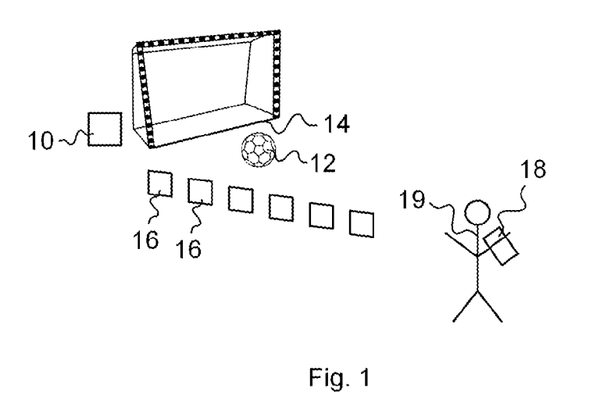
FIG. 1 shows a schematic illustration of a transmitter and a receiver according to one embodiment.

FIG. 1 shows a schematic illustration of embodiments of a transmitter 10 and a receiver 18 for a system for detecting an event corresponding to a movable object 12 crossing a monitored line 14. This means, transmitter and receiver may be coupled to an event detection system, like e.g. a goal detection system.

According to one embodiment, the system for detecting an event is configured to detect a passage of the movable object 12, for example a ball or puck, through a detection plane (e.g. a goal plane), in which the monitored line 14 is located, using electro-magnetic fields and/or signals. In some ball sports, for example soccer or football, the use of automatic goal shot detection systems is discussed in order to prevent human errors. This so-called Goal Line Technology here is a technology which may determine when the ball 12 crossed the goal line 14 and supports the referee in the decision whether a goal was scored or not.

In this respect, there are different alternative approaches for determining the exact position or location where exactly the ball 12 is located, for example video-based systems or systems based on an electro-magnetic field.

In one embodiment of a system which is video-based or is a camera-based event detection system, for example different perspectives of a scene may be evaluated.

In one embodiment of a system which is based on an electro-magnetic field the movable object 12, for example a ball, may be provided with an electronic circuit in order to transmit and/or receive and/or reflect electro-magnetic signals. For such electro-magnetic approaches, electronic components within the ball 12 are required, wherein the size of the electronics may be different depending on its functionality and the frequency range used. With small and average systems, the electronics may, for example, be installed in the middle of the ball 12. With goal shot detection systems which need more space and volume, e.g. with systems which utilize magnetic fields in the sub MHz range, required loop antennae and/or the further electronic components may be installed at the perimeter of the ball 12.

In order to acquire detection characteristics which are as independent of rotation as possible, for the system for detecting and/or the goal shot detection system the installation of three orthogonally arranged coils or loop antennae in or at the movable object 12, e.g. a ball, is proposed in order to emit or reflect at least a part of an electro-magnetic field which is, for example, generated at the goal. Due to this orthogonal arrangement of the coils, the rotary position of the ball 12 only has little influence on the electro-magnetic emission or reflection characteristics, as the three orthogonal loop antennae theoretically result in one effective loop antenna whose effective aperture is perpendicular to an incident magnetic field which comes from a (magnetic field) transmitter installed at or close to the goal. That means, the normal of the effective aperture of the effective loop antenna is basically in parallel to the magnetic field vector.

For a correct functioning, i.e. a high accuracy of goal shot detection systems, the electro-magnetic characteristics of the ball or a puck are of decisive importance. In one embodiment for a goal shot detection system, a magnetic field may be generated by means of a current-carrying conductor which passes around a goal frame. The generated magnetic field here is perpendicular to a detection plane which is defined by the goal frame and in which the goal line 14 is located. This stimulating magnetic field is reflected by the ball 14, wherein the reflected signal ought to generate the same direction vector as the stimulating field (due to the ball electronics with a phase shift). The geometrical accuracy of the reflected signal directly influences the measurement result and thus the accuracy of the goal decision.

The detection system is based on three orthogonal coils in the ball 12. Each of the coils may comprise a plurality of windings which are, for example, inserted between the bladder of the ball and the exterior skin or covering material of the ball. In order to achieve an adequate quality of a resonance coil within the ball, the diameter of the coil(s) ought to be as large as possible, meaning that the coils may be installed within or below the covering material of the ball.

It ought to be noted, however, that according to different embodiments apart from goal lines also other lines may be monitored, like e.g. touch lines, penalty lines or the like.

According to embodiments, the transmitter 10 which is coupled to the detection system in order to receive detection signals from the same is implemented to transmit successive data packets 16 to a receiver 18 independent of the occurrence of the event (e.g. "goal") such that each of the data packets 16 comprises a piece of information on a number of events which occurred up to a transmission time of the data packet 16, wherein the transmission times of successive data packets 16 are each in a predetermined transmission time period. Optionally, each of the data packets 16 may comprise a piece of information on the transmission time of the respective data packet 16. Here, the predetermined transmission time period does not refer to a time duration of a data packet 16 but to a time interval in which the data packet 16 may be transmitted. That means, the predetermined transmission time window is larger than the time duration of a data packet, so that a certain flexibility results with respect to the transmission time for a data packet (within the predetermined transmission time period).

The event itself, for example, ought to be transmitted within a maximum transmission time with a maximum delay and/or latency. If, for example, within the maximum transmission time only one data packet is transmitted, the maximum transmission time corresponds to the transmission time period. Alternatively, for example, within the maximum transmission time a plurality of data packets may be transmitted. For this purpose, the maximum transmission time may, for example, be divided onto a plurality of transmission time periods.

Accordingly, the receiver 18 is configured to receive the successive data packets 16 coming from the transmitter 10 independent of the occurrence of the event, wherein each data packet 16 comprises a piece of information on a number of events which occurred up to a transmission time of the data packet 16. The transmission times of successive data packets 16 are each in a predetermined transmission time period. Optionally, each of the data packets 16 may comprise a piece of information on the transmission time of the data packet 16. Consequently, also the reception times of the successive data packets 16 are each in a predetermined reception time period. The reception times differ from the transmission times only by a signal runtime from the transmitter 10 to the receiver 18.

Figure 2:
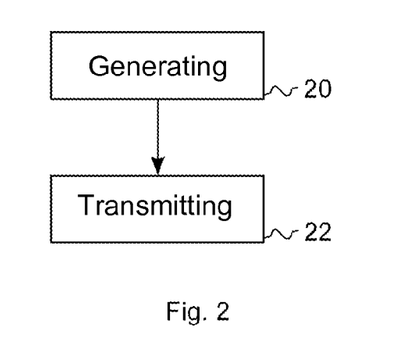
FIG. 2 shows a schematic illustration of a block diagram of a method for transmitting data packets for a system for detecting an event according to the embodiment.

FIG. 2 shows a schematic illustration of a block diagram of a method for transmitting the data packets 16 according to the embodiment. Here, the method may be executed by the transmitter, if in operation.

As illustrated in FIG. 2, in the method for transmitting the data packets 16 20 the successive data packets 16 are generated in one method act such that each of the data packets 16 comprises a piece of information on a number of events which occurred up to a transmission time of the data packet 16. In a further method act 22, the successive data packets 16 are transmitted independent of an occurrence of the event such that transmission times of successive data packets 16 each are in a predetermined transmission time period.

Figure 3:
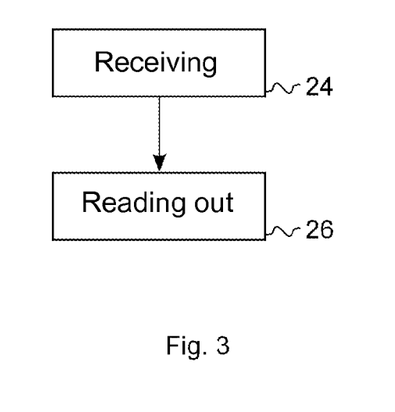
FIG. 3 shows a schematic illustration of a block diagram of a method for receiving data packets for a system for detecting an event according to the embodiment.

FIG. 3 shows a schematic illustration of a block diagram of a method for receiving data packets. Here, the receive method may be executed by the receiver 18, if in operation.

As one method act 24 the receive method includes receiving successive data packets 16 independent of an occurrence of the event, wherein their transmit and/or receive times each are in a predetermined transmit and/or receive time period. As a further method act 26 the method includes reading out the data packets 16, wherein each data packet 16 comprises one piece of information on a number of events which occurred up to a transmission time of the data packet. Optionally, the data packet 16 may comprise a piece of information on the transmission time of the data packet 16. That means, for example, when reading out 26 the information on the transmission time and/or the information on the number of occurred events is read out so that it may subsequently be evaluated.

In the following, without limitation of generality, reference is in particular made to embodiments in which the system for detecting the event is a goal detection system. Accordingly, the event is a goal, and/or a ball being the object 12 crossing a goal line being the monitored line 14.

By the transmission of the successive data packets 16 it may be facilitated, for example, that the information on whether a goal has been detected or not is transmitted to the receiver 18 within a relatively short time. In the present embodiment, a referee 19 who may move around the field has the receiver 18 being a mobile unit on him, for example on a wristband or integrated into a watch, as illustrated in FIG. 1. The referee 19, for making a decision, may promptly be provided with the information whether the goal detection system has detected a goal. Further, for example, as the data packets 16 are transmitted independent of the event, information transmission may be implemented relatively tap-proof, so that only the referee 19 receives the information and only he is informed on the detection of the event and/or the detection result. In other words this means that the information may be transmitted so that neither from the time of transmission nor from the transmitted amount of data a detected event and/or a goal event which has taken place may be concluded. Additionally or alternatively, the data packet 16 may be transmitted in an encoded and/or encrypted way. Only from the decoded data content and/or data packet may a conclusion be made regarding the detection of the event and/or the goal event.

Figure 4:
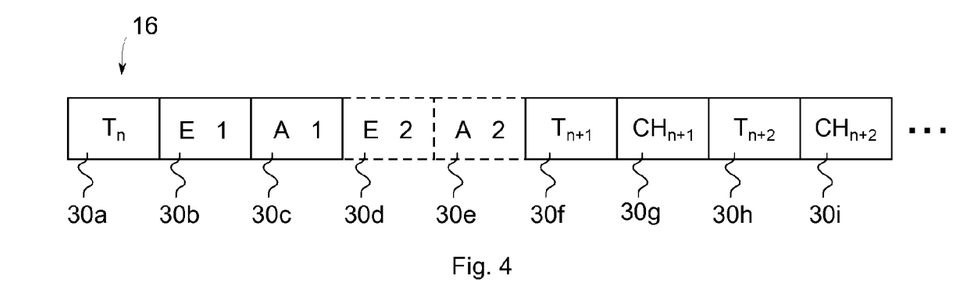
FIG. 4 shows a schematic illustration of a telegram of a data packet according to one embodiment for transmitting information of a goal detection system.

FIG. 4 shows a schematic illustration of a packet and/or telegram set-up for the transmission of the information of the goal detection system.

As illustrated in FIG. 4, a data packet 16 and/or its telegram may comprise a plurality of data fields 30*a* to 30*i*. The data packet 16 which may also be called n-th transmission packet optionally includes, as illustrated in FIG. 4, a piece of information on the transmission time $T_n$ in the data field 30*a*. For example, the time $T_n$ may be given in seconds or milliseconds. The time and/or the transmission time $T_n$ may be measured from a defined zero time (e.g. date and time) which is known to the transmitter 10, the receiver 18 and/or the overall system. Further, in the data field 30b the data packet 16 includes information on the number of occurred events E1. In the present embodiment, the information E1 is a count and/or a goal counter. Other embodiments may also be possible. In a further optional data field 30c the data packet 16 further includes a piece of information on the age A1 of the event E1, that means a piece of information on the age of the goal count. The information A1 may here, for example, be a timestamp or a time value or a count which indicates how many data packets 16 ago the event and/or the increase of the number E1 of events took place. Based on the age information the receiver 18 may decide independently, for example, whether a currently received piece of information is still up-to-date and ought to be indicated to a user, for example a referee 19.

Optionally, in the data fields 30f to 30i the data packet 16 includes further information on radio resources relating to the next and second next transmitted data packet, i.e. future data packets. In the present embodiment, the optional data field 30f comprises a transmission time $T_{n+1}$ of the next data packet and the optional data field 30g comprises a (frequency) channel of the next data packet $CH_{n+1}$. In the optional data field 30h the data packet 16 comprises a piece of information on the transmission time $T_{n+2}$ of the second next data packet and in the optional data field 30i it comprises a piece of information on the channel $CH_{n+2}$ of the second next data packet.

Information on the radio resources as contained in the data fields 30f to 30i may directly or indirectly be contained in the data packet 16 and e.g. have resulted from pseudo-randomly generated sequences. The value $T_{n+1}$ and/or $T_{n+2}$ preferably is a time interval to the next transmission time or is the next transmission time itself. The next transmission time here is located in a subsequent predetermined transmission time period and/or interval. The radio resources regarding the channel may optionally be contained in the data packet 16, for example in case of frequency spreading (e.g. FHSS=Frequency Hopping Spread Spectrum), and indicate a transmission channel of the next transmission packet or the second next transmission packet.

Additionally or alternatively, and indicated in dashed lines in FIG. 4, in a further embodiment, the data packet 16 may also comprise information on a second event E2 in the data field 30d and, analogue to the previously described embodiment, a piece of information on an age A2 in the data field 30e of the second event E2. In the present embodiment, the event E2 in the data field 30d is a goal counter or a count regarding a second goal.

Figure 5:
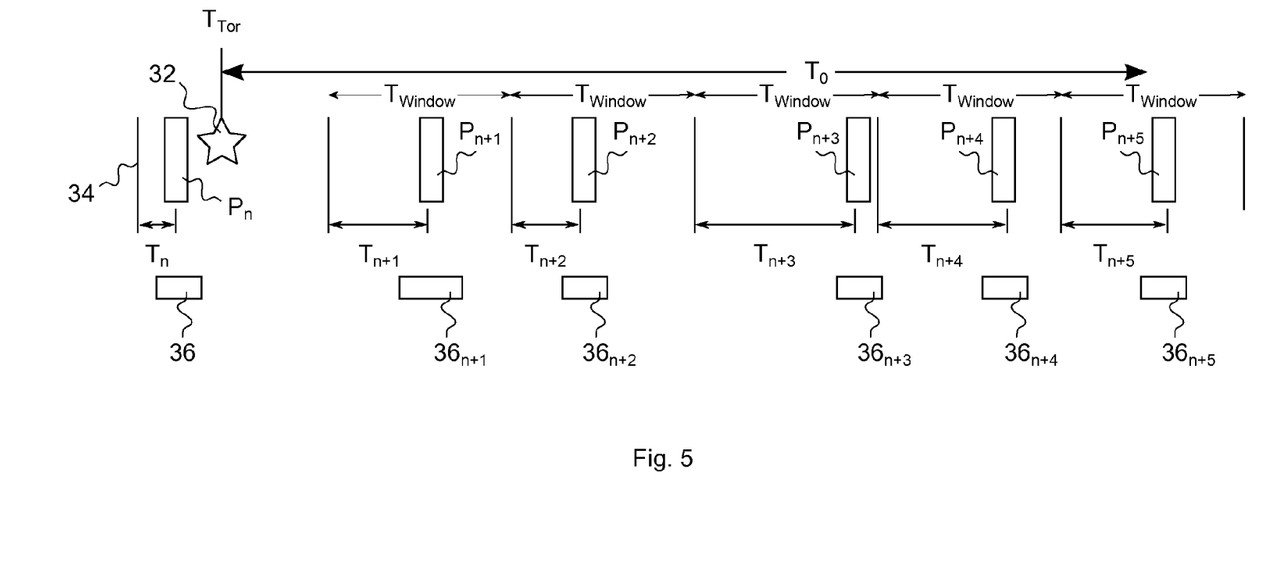
FIG. 5 shows a schematic illustration of a transmission format of the transmission packets according to one embodiment.

FIG. 5 shows a schematic illustration of a transmission format of data and/or transmission packets according to one embodiment.

As illustrated in FIG. 5, a first data packet with the designation $P_n$ is transmitted at the transmission time $T_n$. The transmission time $T_n$ may here be indicated to be a time period from a predetermined time zero or reference point 34 or may be an absolute time value. At a time $T_{Tor}$ (Tor=goal) a goal event and/or a goal 32 is detected. Thereupon, the goal counter E1 in the data field 30b of the corresponding goal is incremented and updated in the next data packet $P_{n+1}$ and/or in the telegram of the next data packet $P_{n+1}$. The next data packet $P_{n+1}$ thus comprises a number E1 of goal events which is increased as compared to the number E1 transmitted in the data packet Pn. Between the two data packets $P_{n+1}$ and $P_{n+2}$, as illustrated in FIG. 5, a maximum delay $T_{Window}$ may be maintained. Thus, a certain equidistribution for example regarding a requested sender duty cycle corresponding to a proportion of actual transmission times as compared to the overall time and/or the predetermined transmission time window (sender duty cycle=ratio transmission times/overall time) may be maintained. In other words, for a periodic sequence of pulses (corresponding to the data packets 16), the sender duty cycle indicates the ratio of pulse duration (data packet duration) to (average) pulse period duration (corresponding to the predetermined transmission time period). The sender duty cycle is conventionally given as a dimensionless ratio having a value from 0 to 1 or 0 to 100%. For example, in this respect the transmit data stream is divided into equally sized, predetermined time windows $T_{Window}$. In the present embodiment, a defined time $T_0$ (e.g. one second) within which the goal event is to be transmitted is divided into equal time windows $T_{Window}$, wherein $T_{Window}=T_0 \cdot k$. In the present embodiment, the following values are selected: $T_{Window}=200$ ms, $T_0=1$ s, k=5. In further embodiments which are not illustrated $T_{Window}$ may be in a range from 1 ms to 1 s, $T_0$ may be in a range from 100 ms to 10 s, and k in a range from 1 to 100.

In other words, each of the data packets $P_n$, $P_{n+1}$, $P_{n+2}$, etc. is transmitted within a predetermined transmission time window $T_{Window}$. Within this time window having the length $T_{window}$ the actual transmission time may be selected randomly and/or variably by the transmitter 10, but always so that the transmission of the data packet is terminated up to the end of the respective time window $T_{Window}$. According to some embodiments, the data packet $P_n$ contains at least one next transmission time $T_{n+1}$ of the next transmission packet $P_{n+1}$ at the time $T_n$.

In further embodiments which are not illustrated, the defined time within which the event is to be transmitted may comprise a different value which is divided into more or less sections k.

Due to the division into several shorter transmission time windows, the information on the number of events E1 and/or the data packets may be transmitted k times, which is 5 times in the present embodiment, within the requested transmission time $T_0$. As with every data packet 16 the receiver 18 is also informed on the transmission time $T_{n+1}$ and/or $T_{n+2}$ of the next data packet, the receiver 18 may estimate a receive time period and/or receive time window 36 of the next data packet. A receive time will be after the respectively corresponding transmission time by a signal runtime from transmitter 10 to receiver 18. According to the estimated receive time periods and/or windows 36 and/or the intermediate ranges in which no data packets are expected, the receiver 18 may reduce a receiver power of a receiver circuit and thus save current. In time at the beginning of a new, subsequent receive time window, the receiver 18 may again increase the receiver power of the receive circuit and/or activate the same in order to obtain and/or receive the data packet. By this, for example, the current consumption of the receiver 18 may be reduced. Thus, the receiver 18 may possibly be battery-operated with a comparatively small energy storage unit and/or battery. In other words, as according to some embodiments the at least next transmission time of the data packet is communicated to the receiver, the same may increase the receive power of its receiver circuit in time in advance and/or activate the same, for example activate an HF (high frequency) receive circuitry and, if applicable, deactivate the same again directly after the reception of the complete data packet. A frequency range utilized by the transmitter 10 and the receiver 18 may, for example, be in the 2.4 GHz band.

In order to enable a safe transmission of the goal event 32 it would be sufficient for the receiver 18 to receive a data packet 16 once within the requested maximum transmission time. And additionally, as not the goal event 32 per se but always the goal count is transmitted, the receiver 18 might still determine at a later time outside the transmission time $T_0$ whether the goal event 32 took place.

If the receiver 18 has received a data packet 16 and within the same the transmission times $T_{n+1}$ and/or $T_{n+2}$ of the next data packets, in particular the transmit packets k−1, then according to one embodiment, the receiver 18 may reduce a receive power of its receiver circuit for the next two transmission time windows $T_{Window}$ and/or go to sleep and, for example, save current. Assuming the next data packet is received completely and correctly, the piece of information on the goal event would still be transmitted to the receiver 18 within the requested transmission time $T_0$ and/or the receiver 18 would receive the piece of information.

In some further possible embodiments, however, the receiver 18 does not go to sleep for too long and/or reduce the receive power of the receiver circuit such that it just about still receives a data packet but remains active for so long and/or controls the receive power such that it has the possibility to receive several data packets within the maximum transmission time $T_0$.

Should the receiver 18 not be able to receive a data packet at all or not completely, it may possibly neither receive the piece of information on the transmission time of the next data packet. In order to prevent that the receiver 18 does not increase the receive power of the receiver circuit again in such a case, the receiver 18 may remain active and/or keep the receive power of the receiver circuit active until it receives a further data packet $P_{n+i}$ completely with a correct transmission time for the next data packet. In other words, the receiver may enter a so-called acquisition mode.

In further non-illustrated embodiments, for example, transmission packets 16 may be transmitted from the transmitter 10 in shorter intervals and thus more frequently to be able to reliably transmit the piece of information on the goal event 32 and/or the number of goal events also in the event of a malfunction.

In further embodiments, the length and/or interval of the transmission time windows $T_{Window}$ may also be adapted to a current game situation. For example, the transmission time windows may comprise a shorter interval when the ball is closer to the goal and by contrast a longer transmission time period or a longer interval when the ball is out of play and/or further away from the goal.

Figure 6:
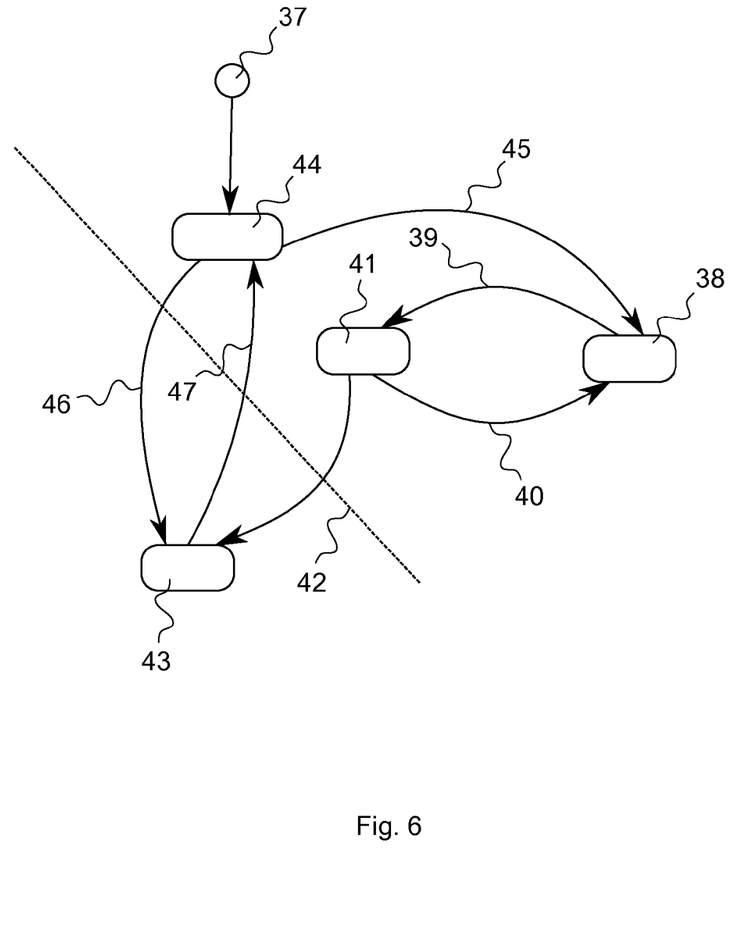
FIG. 6 shows a schematic illustration of a state diagram of the receiver in a cabin mode according to one embodiment.

FIG. 6 shows a schematic illustration of a state diagram of the receiver according to one embodiment.

As it is schematically illustrated in FIG. 6, the receiver 18 and/or a watch into which the receiver 18 may be integrated may operate in two different modes, that is the already described acquisition mode and a so-called tracking mode.

When the receiver 18 is located outside a reception range of the transmitter, for example in a cabin, the battery-operated receiver 18 would continuously remain active and consume current, as it receives no data packet with the transmission time of a subsequent data packet. Consequently, the current consumption of the receiver 18 would be increased. The receiver 18 might be configured in a non-current saving way. Thus, the receiver 18 is configured to reduce a receive power of the receiver circuit and/or switch into a so-called "cabin mode" after a certain time $T_{Timeout-start}$ which may correspond to a multiple of the transmission time window $T_{Window}$ and during which no data packets are received. In other words, after a certain time which is longer than $T_{Window}$ and during which no data packets are received the receiver 18 may change into a non-active state. The determined time which triggers the cabin mode here, $T_{Timeout-Start}$, is clearly longer than $T_{Window}$, for example by a defined value which is known to the receiver. This way it may be facilitated for the receiver to differentiate between missing a data packet and the state that it is located outside the reception range of the transmitter 10 and cannot receive a data packet for quite some time.

In the cabin mode it may be provided that the receiver 18 is not continuously inactive but only for a time period $T_{Timeout-Cabin-Off}$ which is longer than a transmission time window $T_{Window}$. That means, the receiver may again and again switch into an active mode for certain time periods and/or for the duration of a transmission time window $T_{window}$ or for a time period which is somewhat longer than a transmission time period in order to check whether it is again located within a reception range of the transmitter 10 and may receive data packets.

As illustrated in FIG. 6, the receiver may change from an initial state 37 into an acquisition mode 44 if it does not receive a data packet within the transmission time period and/or at the transmission time which the current data packet communicated for the next data packet to be expected and/or the resulting reception intervals, and from this acquisition mode 44 into the cabin mode and an inactive and/or switched-off state 38 when it does not receive a data packet for a time period 45. This state may be called "cabin-off". After a time period T Timeout-Cabin-Off, indicated by the arrow 39, the receiver 18 may change into a so-called "Cabin-On"-Mode, i.e. a so-called active cabin mode 41. In the active cabin mode 41, the receiver may check, whether it is already in a range again in which it may receive data packets. In this respect the receiver 18 may again and again increase and/or activate its receive power of its receiver circuit in certain time intervals, as already mentioned. When the receiver 18 receives no data packets in the active cabin mode, it may again change back into the inactive cabin mode 38, as indicated by arrow 40.

When the receiver 18 receives a data packet in its acquisition mode 44 within an interval and/or a receive time window corresponding to the transmission time of a next data packet previously announced by data packets, the receiver 18 may, as indicated by arrow 46, change into a so-called tracking mode 43 and go into an idle mode for a certain time period TimeOutTrack and/or reduce the receive power of its receiver circuit, as indicated by arrow 47, in order not to consume too much current up to the next receive time window and/or receive interval of the next data packet. Also from the "Cabin-On"-mode, that is the so-called active cabin mode 41, the receiver 18, as indicated by the dashed line 42, may enter the so-called tracking mode 43 if it receives a data packet with a transmission time of the next data packet.

Figure 7:
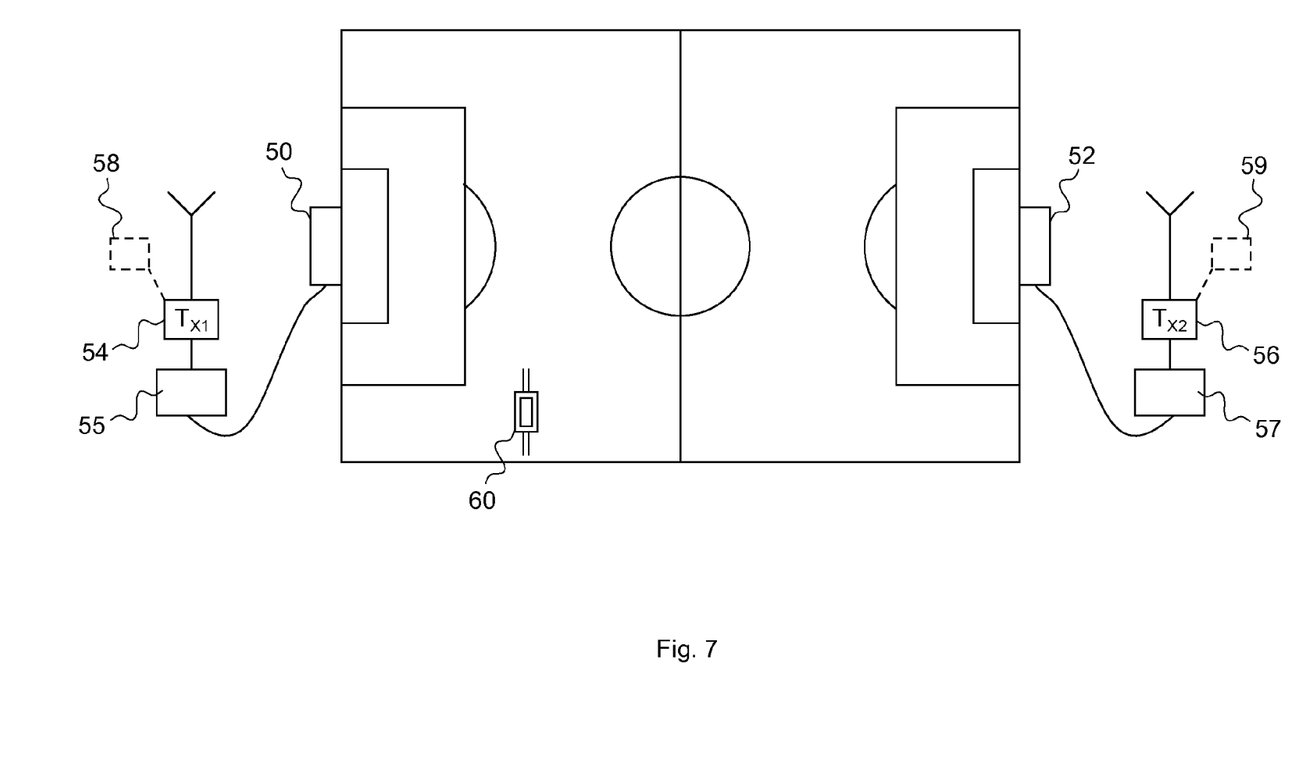
FIG. 7 shows a schematic illustration of a system overview of a goal detection system comprising transmitters at each goal according to an embodiment.

FIG. 7 shows a schematic illustration of a system overview of a goal detection system comprising transmitters at each goal according to one embodiment.

As illustrated in FIG. 7, the system of the present embodiment includes a first goal 50 and a second goal 52. A first transmitter 54 is associated with the first goal 50 and a second transmitter 56 with the second goal 52. The second transmitter 56 may, for example, serve as a repeater and/or function according to the principle of a repeater. FIG. 7 shows an embodiment in which the transmitter 54 is associated with a goal detection system 55 and the transmitter 56 is associated with a goal detection system 57. The transmitter 54 may possibly access to resources, for example radio resources of the transmitter 56 and/or the resources of the data packets of the transmitter 56.

In other words this means that a receiver 60 which is, for example, carried by a referee, may receive goal events and/or a number of goal events from the first transmitter 54 and the second transmitter 56. So that the data packets of the transmitters 54 and 56 do not collide, the transmitters 54 and 56 may, for example, be synchronized with each other.

In order to, for example, facilitate a time-division multiplexing, the transmit frame, i.e. the maximum transmission time $T_0$, may be divided into twice the number (2×k) of transmission time periods and/or transmission windows as compared to the embodiment of FIG. 5. The transmitter 54, for example, transmits in the transmission time periods and/or time windows of odd numbering, the transmitter 56, for example, transmits in the transmission time periods and/or transmission windows of even numbering (TDMA). Within the transmission time periods and/or transmission time windows each of the transmitters 54 or 56 may randomly select a variable time and/or transmission time for transmitting the data packets.

According to a further embodiment, in each of the transmitters 54 and 56 a receiver may be integrated and/or the transmitter 54 may comprise a receive module 58 and the transmitter 56 a receive module 59. Alternatively, only one of the two transmitters may comprise a receive module. The receive module 58 here is adapted to receive data packets from the transmitter 56, for example in a time-division multiple access method. Each of the transmitters 54 and 56 and/or their receiver modules 58 and 59 receive the data packets of the other transmitter during their own transmission break. Additionally or alternatively, the transmitters 54 and 56 may also transmit on different frequency channels instead of at different transmission times. This way it may become possible that the transmitters 54 and 56 do not interfere with each other when they transmit at the same time.

The transmitter 54 may take over the information on a goal count of the goal 52 from a received data packet of the transmitter 56 into its current data packet. The transmitter 56 may do this analogously for the goal count of the goal 50. This way it may be facilitated that the data packets of the transmitter 54 and/or also the data packets of the transmitter 56 show the goal count of the goal 50 and also the goal count of the goal 52, i.e. information on two different events. This may, for example, lead to a redundant signal transmission path. As the transmitters 54 and 56 are opposite to each other and possibly do not change their position with respect to each other and/or may also comprise a good antenna, the transmission of data packets between the transmitters may be very safe and enable a reliable exchange of information between the two transmitters 54 and 56 regarding the goal count of the goals 50 and 52. Thus, the exchange of information between the stationary transmitters 54 and 56 may be safer than between one of the transmitters 54 and 56 and the receiver 60, as the receiver 60 in the present embodiment is usually moving around with the referee and/or the watch into which it may be integrated. Thus, the receive signal strength may vary with a distance of the receiver 60 to the transmitter 54 or 56. As the referee and/or the receiver 60 is moving between the transmitters 54 and 56, it may be assumed that when the signal strength from the transmitter 56 decreases for the receiver 60, the receiver 60 is located in a range in which the signal strength of the other transmitter 54 is stronger, so that it is easier receive the data packets of the same. This way it may, for example, be guaranteed, that the receiver 60 always receives a data packet containing both goal counters for both goals 50 and 52 from at least one of the transmitters 54 or 56. Further, the probability may be reduced that the receiver is simultaneously located in a fading-based blind spot of the transmitters 54 and 56.

There is further the possibility, when the receiver 60 has received a data packet from the transmitter 54, that the receiver 60 may do without the data packet of the transmitter 56. For example, the transmitter 54 may generate its data packets so that the same also comprise the transmission times of the next data packet of the second transmitter 56. The receiver 60 may thus reduce a receive power of its receiver circuit beyond this transmission time period and/or the corresponding receive time period in order to save current. In order to guarantee that the information on the radio resources of the next data packet of the transmitter 56 in the transmission packet of the transmitter 54 are up to date, the transmission packets may each at least comprise a piece of information on the age A1, as illustrated in FIG. 4 in data field 30c, or even additional information on the age. In the present embodiment the age indicates how many data packets and/or transmission times the information lies in the past. If, for example, the count is zero, the information is up to date. If the count has a higher value, the information was received in the past according to the value of the count. The receiver 60 would not go to sleep and/or into an idle mode then but receive the next transmission packet of the transmitter 56.

Further, the information A1 on the age of the goal event and/or the additional information may also contribute to the fact that the receiver 60 or, according to the embodiments of FIGS. 1 to 6, the receiver 18 may decide on its own, whether the information on the goal event is still relevant and is to be displayed. This is sensible, for example, when the receiver 60 or 18 is only switched on during the game or was located in a blind spot, for example the cabin. If the goal counter has been incremented as compared to the last data packet received by the receiver 60 or 18, but the age of the goal count is a while back, and/or is high (count age>threshold value) then the increase and/or an incrementing of the goal count is not interpreted as a goal event and not indicated any more. In this case it may be assumed, for example, that the referee has already received and/or indicated the goal event in another way.

Figure 8:
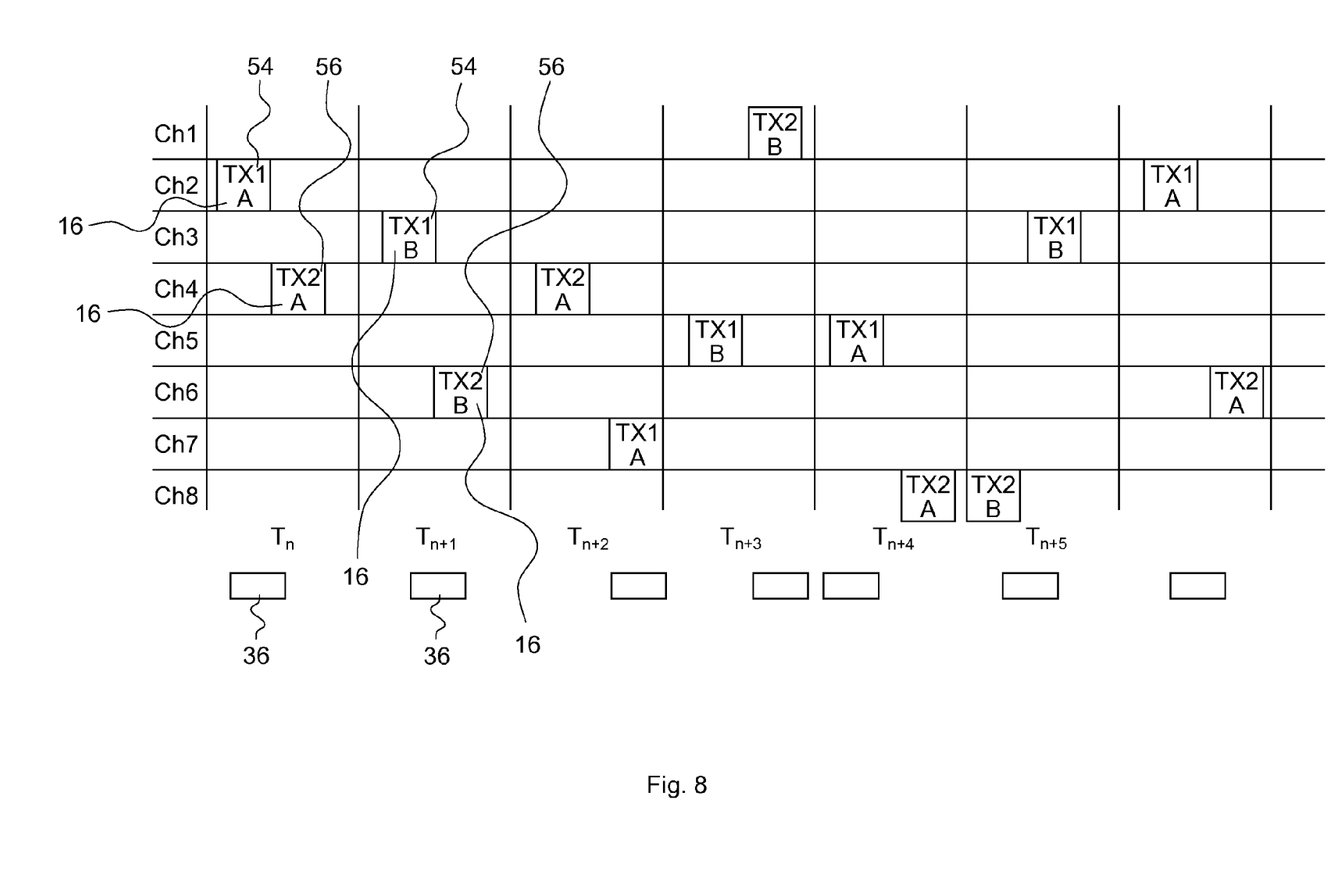
FIG. 8 shows a schematic illustration of a transmission scheme according to a time- and frequency-division multiplexing for the transmission of information from a goal detection system according to one embodiment.

FIG. 8 shows a schematic illustration of a transmission scheme for a time and frequency division multiplexing for the transmission of information from a goal detection system according to one embodiment.

To increase the safety of transmission, the one or several transmitters may each be provided with two geometrically spaced apart antennae which are not illustrated. The antennae may, for example, be connected to the transmitter via a change-over switch according to the principle of antenna diversity. For increasing interference immunity, the data packets may be transmitted at different times in different frequency channels. When using two transmitters 54 and 56, according to the embodiment of FIG. 7, the transmitters 54 and 56 may, for example, transmit within one transmission time period or at one transmission time on different frequency channels Ch1, Ch2, Ch3, etc. without interfering with one another. By this it may, for example, be facilitated, that the information is transmitted in a comparatively short time. The transmitter 54, for example, transmits in a first transmission time period or at a first transmission time $T_n$ on the frequency and/or the channel or frequency channel Ch2. The transmitter 56 transmits in the first transmission time period or at the first transmission time $T_n$ on the frequency Ch4. From the information transmitted in the data packet at the transmission time of the following data packet, the receiver 60 may estimate the receive time period and/or the receive time window 36. Analogously, the transmitters 54 and 56 also transmit in the second transmission time period and/or at the second transmission time $T_{n+1}$ on different channels. The transmitter 54 transmits on channel Ch3, the transmitter 56 transmits on channel Ch6. As indicated in FIG. 8, the transmitters 54 and 56 may additionally or alternatively also transmit their data packets 16 at different times within the transmission time periods.

The features disclosed in the above description, the following claims and the accompanying figures may, both individually and in any combination, be of importance and be implemented for the realization of an embodiment in their various configurations.

Depending on specific implementation requirements, embodiments of the invention may be implemented in hardware or in software. The implementation may be performed using a digital storage medium, e.g. a floppy disk, a DVD, a Blu-ray disc, a CD, a ROM, a PROM, an EPROM, an EEPROM or a flash memory, a hard drive or any other magnetic or optical memory, on which electronically readable control signals are stored which may interact, or interact, with a programmable hardware component such that the respective method is executed.

A programmable hardware component may be formed by a processor, a computer processor (CPU=Central Processing Unit), a graphics processor (GPU=Graphics Processing Unit), a computer, a computer system, an application-specific integrated circuit (ASIC), an integrated circuit (IC), a System on Chip (SOC), a programmable logic element or a field programmable gate array with a microprocessor (FPGA=Field Programmable Gate Array).

The digital storage medium may therefore be machine-readable or computer-readable. Some embodiments also comprise a data carrier which comprises electronically readable control signals capable of interacting with a programmable computer system or a programmable hardware component such that one of the methods described herein is executed. Thus, an embodiment is a data carrier (or a digital storage medium or a computer-readable medium) on which the program is recorded for executing one of the methods described herein.

In general, embodiments of the present invention may be implemented as a program, firmware, computer program or a computer program product having a program code or as data, wherein the program code or the data is effective to execute one of the methods if the program runs on a processor or a programmable hardware component. The program code or the data may, for example, also be stored on a machine-readable carrier or data carrier. The program code or the data may be available as a source code, machine code or byte code amongst others, and as another intermediate code.

Another embodiment is furthermore a data stream, a signal order or a sequence of signals which represent(s) the program for executing one of the methods described herein. The data stream, the signal order or the sequence of signals may, for example, be configured to be transferred via a data communication connection, e.g., via the internet or another network. Therefore, embodiments are also signal orders which represent data and which are suitable for being sent via a network or a data communication connection, wherein the data represents the program.

A program according to one embodiment may implement one of the methods during its execution by, for example, reading out its storage locations or by writing a datum or several data into the same, whereby, if appropriate, switching operations or other operations are caused in transistor structures, in amplifier structures or in other electrical components, optical components, magnetic components or components working according to another operating principle. Accordingly, by reading out a storage location, data, values, sensor values or other information may be captured, determined or measured by a program. Therefore, a program may capture, determine or measure quantities, values, measured quantities and other information by reading out one or several storage locations, and may effect, arrange for or carry out an action and control other equipment, machines and components by writing into one or several storage locations.

The embodiments described above merely illustrate the principles of the present invention. It will be understood that modifications and variations of the arrangements and details described herein are clear to other persons skilled in the art. Therefore, it is intended that the invention be merely limited by the scope of the following patent claims and not by the specific details which were presented on the basis of the description and the explanation of the embodiments.

The invention claimed is:

1. A transmitter for a system for detecting an event corresponding to an object crossing a monitored line,
   wherein the transmitter is configured to successively transmit data packets independently of the occurrence of the event,
   each data packet comprising a piece of information on a number of events which occurred up to a transmission time of the data packet,
   wherein the transmission times of successive data packets are each located in a predetermined transmission time window.

2. The transmitter according to claim 1, wherein the transmitter is configured to generate the data packets such that each of the data packets comprises a piece of information on the transmission time of the data packet.

3. The transmitter according to claim 1, wherein the transmitter is configured to generate each of the data packets such that the data packet comprises a piece of information on a radio resource for a subsequent data packet.

4. The transmitter according to claim 3, wherein the radio resource is a transmission time or a frequency of the subsequent data packet.

5. The transmitter according to claim 1, wherein the transmitter is configured to generate the data packet such that the data packet comprises a piece of information on an age of the occurred event.

6. The transmitter according to claim 1, wherein the transmitter is configured to transmit each of the data packets at a random transmission time such that the data packet is transmitted completely within its predetermined transmission time window.

7. The transmitter according to claim 1,
   wherein the transmitter is configured to transmit the successive data packets by multiplexing using a second transmitter, and the transmitter comprises a receive module which is configured to receive successive data packets of the second transmitter,
   wherein each of the data packets of the second transmitter comprises at least one piece of information on a number of second events which occurred up to the transmission time, and
   wherein the transmitter is configured to generate the successive data packets such that each data packet comprises a piece of information on the number of second events which occurred up to the transmission time.

8. The transmitter according to claim 1, wherein the event is a goal which corresponds to a gaming device, in particular a ball or a puck, crossing a monitored goal line.

9. A receiver for a system for detecting an event corresponding to an object crossing a monitored line,
   wherein the receiver is configured to receive successive data packets independently of the occurrence of the event,
   each of the data packets comprising a piece of information on a number of events which occurred up to a transmission time of the data packet,
   wherein the transmission times of successive data packets are each located in a predetermined transmission time window.

10. The receiver according to claim 9, wherein each of the data packets comprises a piece of information on the transmission time of the data packet.

11. The receiver according to claim 9, wherein the receiver is configured to output a signal which indicates the event that a currently received data packet comprises a piece of information on a number of occurred events which is higher than a number of occurred events according to a preceding data packet.

12. The receiver according to claim 9, wherein the receiver is configured to reduce a receive power of a receiver circuit between two successive data packets based on a piece of information on the transmission time of the subsequent data packet within the current data.

13. The receiver according to claim 12, wherein the receiver is configured to increase the receive power until it receives a subsequent data packet if it does not or not completely receive a data packet within an interval at the transmission time according to a piece of information in a preceding data packet.

14. The receiver according to claim 9, wherein the receiver is configured to decrease a receive power of a receiver circuit if the receiver does not receive any data packet over a time period which is greater than the predetermined time period.

15. The receiver according to claim 14, wherein the receiver is configured to increase the receive power of the receiver circuit for a time period which is greater than the transmission time period.

16. The receiver according to claim 9, wherein the receiver may be worn on a wristband, in particular be integrated into a watch.

17. A method for transmitting data packets for a system for detecting an event corresponding to an object crossing a monitored line, comprising:
   generating successive data packets such that each of the data packets comprises a piece of information on a number of events which occurred up to a transmission time of the data packet,
   transmitting successive data packets independently of an occurrence of the event such that transmission times of successive data packets are each located in a predetermined transmission time window.

18. A method for transmitting data packets for a system for detecting an event corresponding to an object crossing a monitored line, comprising:
   receiving successive data packets independently of the occurrence of the event, whose transmission times are each located in a predetermined transmission time window,
   reading out the data packets, wherein each of the data packets comprises a piece of information on a number of events which occurred up to a transmission time of the data packet.

* * * * *